Dec. 27, 1960   J. BRYER   2,966,247
OVERLOAD RELEASE CLUTCH
Filed May 5, 1958

INVENTOR
JACK BRYER
BY
ATTORNEYS

United States Patent Office 2,966,247
Patented Dec. 27, 1960

2,966,247

OVERLOAD RELEASE CLUTCH

Jack Bryer, Paramus, N.J., assignor to R. Hoe & Co., Inc., New York, N.Y., a corporation of New York Filed May 5, 1958, Ser. No. 733,116

10 Claims. (Cl. 192—56)

This invention relates to clutches or couplings which disengage when the transmitted torque exceeds a predetermined value.

The general object of the invention is to provide an improved clutch or coupling of the type indicated.

Another object of the invention is to provide a clutch in which the uncoupling action, once initiated, is assisted so that the parts disconnect in a positive and definite manner and remain disconnected until reset.

A further object is to provide a clutch of the type indicated equipped with manual engaging and disengaging means whereby the clutch may also be used for disconnecting the driving and driven elements.

A clutch embodying the invention in a preferred form will now be described in connection with the accompanying drawing, and the features forming the invention will then be pointed out in the appended claims.

Figure 1:
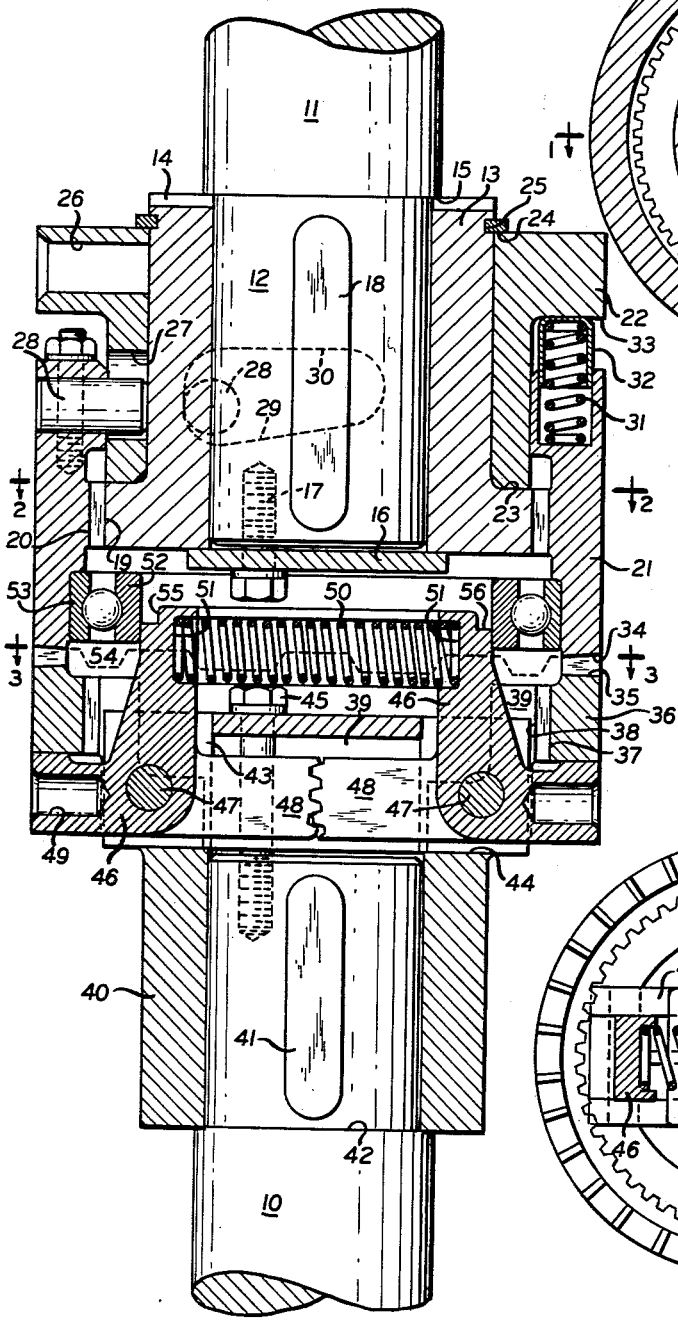
Fig. 1 is a view in approximately axial section and is taken on the general line 1—1 of Fig. 2.
Figure 2:
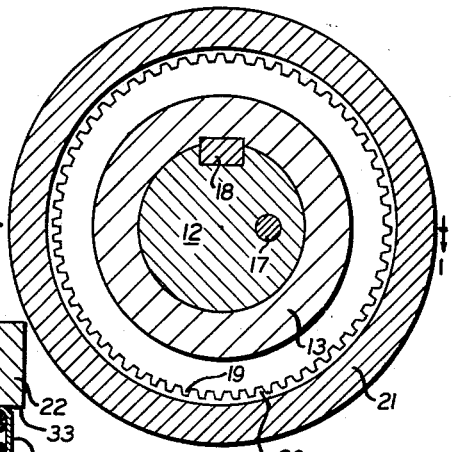
Fig. 2 is a cross section on the line 2—2 of Fig 1.
Figure 3:
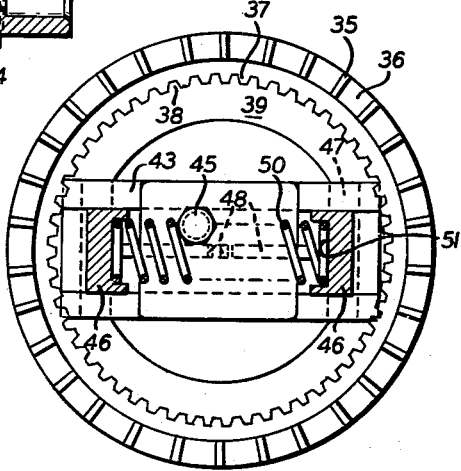
Fig. 3 is a cross section on the line 3—3 of Fig. 1.

In the drawing, there is indicated at 10 a driving shaft and at 11 a driven shaft, these parts being aligned and spaced as indicated and supported by bearings and connected to driving and driven machine elements in any usual way, not shown.

The driven shaft 11 has a reduced end 12 around which fits a hub 13 positioned axially by means of washer 14 abutting against the shoulder 15 and held in place by an end plate 16 and bolt 17, as shown. This member is rotatively fixed to the driven shaft as by means of a key 18. The end of the member 13 is enlarged and is formed with spur spline coupling teeth 19, cooperating with similar internal spline teeth 20 formed on a coupling sleeve 21, which is slidable axially of the shaft 11 and member 13. Interposed between members 13 and 21 is an operating member 22 located axially by a shoulder 23 on the member 13 and by a split ring 24 which snaps in a groove 25 formed in the member 13. Element 22 is formed with one or more sockets 26 to take a bar or wrench for rotating it and with one or more cam slots 27, each cooperating with a pin 28 fixed in the sleeve 21. Cam slot 27 has a slanted or helical camming surface 29 and a dwell surface 30 and is of considerably greater width axially than the member 28, allowing for lost motion as later described. Sleeve 21 is also fitted with springs 31 and bearing cups 32 pressed by the springs against shoulder surface 33 formed on the member 22 referred to above. The sleeve 21 bears at its outer end crown (axially extending) spline teeth 34 which engage corresponding spline crown teeth 35 carried on a coupling member 36 associated with the driving shaft 10, as described below.

Member 36 is formed with internal spline teeth 37 engaging spur spline teeth 38 formed on a piece 39 which has a hub 40 rotatably fixed to the driving shaft 10 by a key 41 and seating against shoulder 42. The member 39 is transversely slotted and receives a cross piece 43 which is held against the bottom 44 of the slot by a bolt 45, also serving to hold the part 39 on the shaft 10. A pair of bell cranks 46 are mounted in the part 43 on pins 47 and have meshing gear segments 48 so that they move in unison. Each of these bell cranks is formed with a socket 49 to take a wrench or bar for rotatably adjusting them about the pins 47. A spring 50 received in sockets 51 in the bell cranks normally tends to urge them apart and holds their upper arms against the inner race 52 of a ball bearing, the outer race 53 of which is held in the sleeve 21, previously referred to. Somewhat above the surfaces 54 of the bell cranks which engage the ball bearing inner races, they are formed with cut outs 55 defining shoulders 56.

Starting with the parts in the position of Fig. 1, which is the normal operating position, it will be apparent that the torque is transmitted from driving to driven shaft through member 39—40, spline teeth 37, 38, crown teeth 34, 35, sleeve 21, spline teeth 19, 20 and member 13, the parts being held in the position shown by the action of spring 31 pressing through sleeve 21 and member 36 against the bell crank elements 46 the arms of which, in which the sockets 49 are formed, engage against the lower surface of the member 36, thus ultimately forcing the bell crank engaging surfaces 54 against the inner race 52 of the ball bearing 52—53. The force exerted by spring 31 may thus be considerably in excess of the resultant force due to the pressure of the slanted spline teeth 34, 35. The angle of these teeth is not critical, but an angle of about 30° to an axial plane will normally be found suitable. If, however, the torque rises to a predetermined value, determined by the stiffness of spring 31 and the proportions of the parts, the reaction of spline teeth 34 against spline teeth 35 will force member 21 back against the action of spring 31. When this movement has progressed to a point where the spline teeth 34, 35 have been moved about half to two-thirds the distance necessary to disengage, the inner race 52 of ball bearing 52, 53 will have reached the level of shoulder 56, at which point spring 50 is permitted to rock the upper arms of the bell cranks 46 away from each other, thus dropping the lower arms containing the sockets 49 and permitting the member 36 to be kicked free. At the same time, the shoulders 56 engaging under the bearing 52, 53 hold the sleeve 21 back in retracted or disengaged position. The coupling will remain accordingly disengaged until reset. Resetting of the clutch may be accomplished by inserting a wrench or bar in a socket 49 so as to rotate a bell crank 46 (and the other bell crank 46 by reason of the engagement of teeth 48) to bring the upper ends of the bell cranks together so that shoulder 56 clears the inner ball bearing race 52, permitting spring 32 to restore the parts to the condition of Fig. 1.

If it is desired to uncouple the driving and driven shafts, this may be accomplished manually by inserting a bar in socket 26 previously referred to and rotating the member 22 so that cam slot surface 29 engaging pin 28 pulls the sleeve 21 back against spring 32 until the teeth 34, 35 are disengaged.

What is claimed is:

1. An overload release clutch comprising a pair of aligned coaxial shaft ends, an axially slidable clutch element carried by each shaft end, cooperating clutch teeth on the two said elements having engaging surfaces slanted with reference to the axis of the said shafts, whereby a separating force proportional to the torque is created, spring means urging a said clutch element toward engaged position, catch means releasably holding the other said clutch element in engaged position, and means operable by the first said clutch element for operating said catch means, upon partial disengagement of the first said clutch element, to release the second said clutch element for disengagement.

2. An overload release clutch comprising a pair of aligned shaft elements, an axially slidable coupling member carried by each said shaft element, the two said members having clutch teeth engaging at an angle to the said axis, thereby creating an axial separative force proportional to the torque transmitted by the said teeth, spring means urging one said member against the other, means normally holding the other said member in an engaging position, spring means urging the last said means toward a position releasing the said other member for movement from engaging position, and a catch opposing the action of the second said spring means, the said catch comprising cooperating elements movable with the two said clutching members, whereby the catch releases upon a partial disengagement of the said clutching members.

3. Overload release clutch mechanism comprising aligned shaft elements, axially movable cooperating clutch members slidably carried by the two said shafts and having cooperating clutch teeth inclined to the axis of the two said shafts, whereby an axial separating force proportional to the torque transmitted is created, spring means urging one of the said clutch members toward fully engaged position, means normally holding the second said clutch member in position for full engagement, and comprising bell crank means having an arm supporting the second said member and a second arm, and abutment means carried by the said second arm and the first said member, the said abutment means being positioned for holding the bell crank means in position for supporting the second said member when the first said member is in engaging position and for movement out of abutting relation upon partial disengagement of the first said member, whereby upon partial disengagement, the second said arm is released, thereby releasing the second said clutching member for complete disengagement of the clutch.

4. Overload release clutch mechanism comprising aligned shaft elements, axially movable cooperating clutch members slidably carried by the two said shafts and having cooperating clutch teeth inclined to the axis of the two said shafts whereby an axial separating force proportional to the torque transmitted is created, spring means urging one of the said clutch members toward fully engaged position, means normally holding the second said clutch member in position for full engagement, and comprising bell crank means having an arm supporting the second said member and a second arm for engaging the first said member, an anti-friction bearing carried by the first said member and having a relatively rotatable race member engaged by the said second arm to hold the bell crank from turning, the said second arm and race member having abutments engaging each other when the first said member is in engaged position and positioned for movement out of abutting relation upon partial disengagement of the first said member, whereby upon partial disengagement, the second said arm is released, thereby releasing the second said clutching member for completely disengaging the clutch.

5. An overload release clutch according to claim 4, comprising also spring means urging the said bell crank means toward releasing position and comprising means on the said second arm for engaging under the relatively rotatable race member to hold the first said clutch member back against the action of the first mentioned spring means.

6. An overload release clutch according to claim 5, comprising also manually operable means for retracting the first said clutch member against the action of the first said spring means, thereby disengaging the clutch element, and operating said bell crank means to hold the clutch element disengaged.

7. An overload release clutch comprising a pair of aligned coaxial shaft ends, a hub fixed to one said shaft end and a clutch sleeve splined to the hub and slidable axially, a manual rotatable operating member also carried by the hub and having a lost motion connection with the sleeve, whereby turning the operating member pulls the sleeve back from engaging position while normally the sleeve is permitted to assume an engaging position, spring means urging the sleeve toward engaging position and cooperating clutch mechanism carried by the other shaft element, comprising a clutch member engaging with the said sleeve and movable axially away therefrom, the said clutch member and sleeve having cooperating surfaces slanted to the shaft axis whereby a separating force proportional to the transmitted torque is developed, latch means for normally holding the second said clutch member in engaging position and releasable upon retraction of the clutch sleeve to permit disengaging movement of the second said clutch member also.

8. An overload release clutch according to claim 7, in which the said latch means comprises a pair of bell crank elements having gear sectors coupling them together for rotation in opposite directions, the said bell crank elements having axially extending arms extending into the said clutch sleeve, an anti-friction bearing carried by the clutch sleeve forming a radial abutment of the said arms, the arms having shoulders engageable under the anti-friction bearing upon retraction of the said sleeve, and spring means normally urging the said arms radially against the said anti-friction bearing.

9. An overload release clutch according to claim 8, in which a said bell crank has a radially extending arm engageable by a wrench for rotating the same against the said spring for resetting the clutch when disengaged.

10. An overload release clutch according to claim 9, in which both said bell cranks have radially extending arms as specified and in which the said radially extending arms support the second said clutch member in engaged position.

References Cited in the file of this patent

UNITED STATES PATENTS 2,259,824    Lowder _____ Oct. 21, 1941

FOREIGN PATENTS 472,568    Germany _____ Mar. 2, 1929
620,377    Germany _____ Oct. 19, 1935